United States Patent
Hudis

(10) Patent No.: US 6,687,116 B2
(45) Date of Patent: Feb. 3, 2004

(54) NON-SYMMETRIC CAPACITOR WITH CONDUCTIVE ADHESION LAYER FOR CATHODE

(76) Inventor: Martin Hudis, 7 Laura La., Mattapoisett, MA (US) 02739

( * ) Notice: Subject to any disclaimer, the term of this patent is extended or adjusted under 35 U.S.C. 154(b) by 0 days.

(21) Appl. No.: 10/167,231

(22) Filed: Jun. 11, 2002

(65) Prior Publication Data

US 2003/0011964 A1 Jan. 16, 2003

Related U.S. Application Data

(63) Continuation of application No. 09/761,967, filed on Jan. 17, 2001, now abandoned, which is a continuation-in-part of application No. 09/358,577, filed on Jul. 21, 1999, now abandoned, which is a continuation-in-part of application No. 09/110,223, filed on Jul. 6, 1998, now Pat. No. 6,208,502.

(30) Foreign Application Priority Data

Jul. 6, 1999 (WO) .............................. PCT/US99/15207

(51) Int. Cl.$^7$ .............................................. H01G 9/00
(52) U.S. Cl. ...................................... 361/502; 361/502
(58) Field of Search ................................. 361/502–521

(56) References Cited

U.S. PATENT DOCUMENTS

| | | | |
|---|---|---|---|
| 2,236,270 A | 3/1941 | Katzman | 175/315 |
| 3,243,316 A | 3/1966 | O'Nan et al. | |
| 3,522,493 A | 8/1970 | O'Mara et al. | 317/258 |
| 3,531,693 A | 9/1970 | Buice | 317/230 |
| 3,628,103 A | 12/1971 | Booe | 317/230 |
| 3,632,498 A | 1/1972 | Beer | 204/290 |
| 3,665,260 A | 5/1972 | Kirkpatrick et al. | 317/230 |
| 3,675,087 A | 7/1972 | Zykov et al. | 317/230 |
| 3,845,364 A | 10/1974 | Shoot | 317/230 |
| 4,020,401 A | 4/1977 | Cannon et al. | 361/433 |
| 4,024,442 A | 5/1977 | Anderson | 361/322 |
| 4,042,484 A * | 8/1977 | Thiele et al. | 204/290.08 |
| 4,184,192 A | 1/1980 | Yoshida et al. | 361/433 |
| 4,244,010 A | 1/1981 | Lintott | 361/433 |
| 4,245,275 A | 1/1981 | Cannon | 361/433 |

(List continued on next page.)

FOREIGN PATENT DOCUMENTS

| | | |
|---|---|---|
| CA | 1196683 | 11/1985 |
| CA | 1270296 | 6/1990 |
| EP | 078 404 A2 0 | 5/1983 |
| JP | 5-6840 A | 1/1993 |
| JP | 5-13282 A | 1/1993 |
| WO | 94/22152 | 9/1994 |
| WO | 96/04670 | 2/1996 |
| WO | 99/27547 | 6/1999 |

OTHER PUBLICATIONS

Miller et al., "Properties and Performance of Hybrid Aluminum Electrolytic/Electrochemical Capacitors," Evans Capacitor Company Technical Papers, Carts 96: 15$^{th}$ Cap. & Resistor Tech Sym., Mar. 11–15 1996; web page at http://www.evanscaP.com/carts 16–2.html, May 6, 1998.

Evans Capacitor Company Latest News!; web page at http://www.evanscap.com/Evanscap%20news%20Oct97. html., May 6, 1998.

(List continued on next page.)

Primary Examiner—Dean A. Reichard
Assistant Examiner—Eric Thomas
(74) Attorney, Agent, or Firm—Fish & Richardson P.C.

(57) ABSTRACT

A capacitor of the type having a cathode and an anode and an electrolyte disposed between the cathode and the anode, the capacitor including an electrochemical cathode including a metal current collector, at least one conductive adhesion layer deposited on the metal current collector, a finely divided material deposited on the adhesion layer, an electrolytic anode including an oxide forming metal and a corresponding insulating metal oxide, and an electrolyte in contact with the finely divided material on the cathode and the oxide on the anode.

14 Claims, 15 Drawing Sheets

U.S. PATENT DOCUMENTS

| | | | |
|---|---|---|---|
| 4,296,458 A | 10/1981 | Smith et al. | 361/433 |
| 4,300,992 A | 11/1981 | Yoshida et al. | 204/242 |
| 4,327,400 A | 4/1982 | Muranaka et al. | 361/433 |
| 4,376,713 A | 3/1983 | Dunkl | 252/62.2 |
| 4,408,259 A | 10/1983 | Muranaka et al. | 361/434 |
| 4,480,290 A | 10/1984 | Constanti et al. | 361/433 |
| 4,523,255 A | 6/1985 | Rogers | 361/433 |
| 4,562,511 A | 12/1985 | Nishino et al. | 361/324 |
| 4,766,522 A | 8/1988 | McHardy et al. | 361/433 |
| 4,780,796 A | 10/1988 | Fukuda et al. | 361/433 |
| 4,780,797 A | 10/1988 | Libby | 361/433 |
| 4,803,596 A | 2/1989 | Hellwig et al. | 361/525 |
| 4,888,666 A | 12/1989 | Naitoh et al. | 361/512 |
| 4,942,500 A | 7/1990 | Libby et al. | 361/516 |
| 4,942,501 A | 7/1990 | MacFarlane et al. | 361/523 |
| 4,992,910 A | 2/1991 | Evans | 361/502 |
| 5,032,473 A * | 7/1991 | Hoge | 429/42 |
| 5,043,849 A | 8/1991 | Libby | 361/516 |
| 5,079,674 A | 1/1992 | Malaspina | 361/502 |
| 5,098,485 A | 3/1992 | Evans | 148/272 |
| 5,131,388 A | 7/1992 | Pless et al. | 128/419 D |
| 5,136,474 A | 8/1992 | Sarangapani et al. | 361/502 |
| 5,150,283 A | 9/1992 | Yoshida et al. | 361/502 |
| 5,153,820 A | 10/1992 | MacFarlane et al. | 361/523 |
| 5,230,712 A | 7/1993 | Matthews | 29/25.03 |
| 5,369,547 A | 11/1994 | Evans | 361/516 |
| 5,400,211 A | 3/1995 | Evans | 361/502 |
| 5,450,279 A | 9/1995 | Yoshida et al. | 361/502 |
| 5,464,453 A | 11/1995 | Tong et al. | 29/25.03 |
| 5,469,325 A | 11/1995 | Evans | 361/526 |
| 5,478,676 A | 12/1995 | Turi et al. | 429/234 |
| 5,492,604 A | 2/1996 | Ray | 205/373 |
| 5,549,989 A | 8/1996 | Anani | 429/193 |
| 5,550,706 A | 8/1996 | Kurzweil et al. | 361/502 |
| 5,552,245 A | 9/1996 | Li et al. | 429/188 |
| 5,559,667 A | 9/1996 | Evans | 361/526 |
| 5,568,353 A | 10/1996 | Bai et al. | 361/523 |
| 5,584,890 A | 12/1996 | MacFarlane et al. | 29/25.03 |
| 5,585,999 A | 12/1996 | DeLong et al. | 361/505 |
| 5,587,871 A | 12/1996 | Ue et al. | 361/504 |
| 5,600,535 A | 2/1997 | Jow et al. | 361/503 |
| 5,621,609 A | 4/1997 | Zheng et al. | 361/503 |
| 5,629,829 A | 5/1997 | Ikeya | 361/505 |
| 5,648,619 A | 7/1997 | Gustafsson | 73/865.8 |
| 5,649,982 A | 7/1997 | Halliop | 29/25.03 |
| 5,660,737 A | 8/1997 | Elias et al. | 216/6 |
| 5,728,181 A | 3/1998 | Jung et al. | 29/623.5 |
| 5,737,181 A * | 4/1998 | Evans | 361/504 |
| 5,754,394 A * | 5/1998 | Evans et al. | 361/516 |
| 5,786,980 A | 7/1998 | Evans | 361/502 |
| 5,797,971 A | 8/1998 | Zheng et al. | 29/25.03 |
| 5,851,506 A | 12/1998 | Zheng et al. | 423/592 |
| 5,868,913 A | 2/1999 | Hodgson | 204/298.01 |
| 5,875,092 A | 2/1999 | Jow et al. | 361/502 |
| 5,920,455 A * | 7/1999 | Shah et al. | 361/502 |
| 5,922,215 A | 7/1999 | Pless et al. | 216/6 |
| 5,930,108 A | 7/1999 | Kurzweil et al. | 361/502 |
| 5,955,215 A | 9/1999 | Kurzweil et al. | 429/41 |
| 5,961,887 A | 10/1999 | Zheng et al. | 252/502 |
| 5,982,609 A | 11/1999 | Evans | 361/516 |
| 6,005,765 A | 12/1999 | Maeda et al. | 361/502 |
| 6,017,430 A | 1/2000 | Hodgson et al. | 204/290 R |
| 6,025,020 A | 2/2000 | Chen et al. | 427/226 |
| 6,038,123 A | 3/2000 | Shimodaira et al. | 361/502 |
| 6,094,339 A | 7/2000 | Evans | 361/516 |
| 6,097,588 A | 8/2000 | Zheng et al. | 361/503 |
| 6,123,816 A | 9/2000 | Hodgson | 204/290 |

OTHER PUBLICATIONS

Evans, "Forty Kilojoule Carbon Double Layer Capacitor," Evans Capacitor Company Technical Papers, presented at the Int'l Seminar on Double Layer Capacitors and Similar Energy Storage Devices, Dec. 6, 1993; web page at http://www.evanscap.com/isdle3.html.

Evans et al., "Performance of Mil–Type Hybrid Tantalum Capacitors,"Evans Capacitor Company Technical Papers; web page at http://www.evanscap.com/carts 15–2 html, May 6, 1998.

Evans Capacitor Company, "The Capattery", web page at http://www.evanscap.com/morecap.html, May 6, 1998.

Evans, "A 170 Volt Tantalum Hybrid Capacitor –Engineering Considerations," Presented to the 7th Int. Seminar on Double Layer Capacitors and Similar Energy Storage Devices, Florida, Dec. 8–10, 1997.

Evans Capacitor Company, "Comparison of Hybrid and Aluminum Electrolytic Performance," Hybrid Capacitor Technical Data, Aug. 1988; web page at http://www.evanscap.com/hybrid%20technical%20data.html, May 6, 1998.

Evans Capacitor Company, "Polypropylene Case," Hybrid Capacitor Poly Caase –Data Sheet, Aug. 1998; web page at http://www.evanscap.com/hybrid.poly%20data%20sht.html, May 6, 1998.

Evans, "Hermetic Hybrid Capacitors (and Other Goodies)," Presented at the 6th Int. Seminar on Double Layers Capacitors and Similar Energy Storage Devices, Florida, Dec. 9, 1996.

"The Electrochemical Behavior of Ruthenium Oxide ($RuO_2$) as a Material for Electrochemical Capacitors"No Date.

Libby, "Counterelectrode Preparation for an Improved Tantalum Electrolytic Capacitor Meeting at the Requirements of MIL–C–39006/26, 27," pp. 134–138.

Raistrick et al., "Transition Metal Oxide Electrochemical Capacitors," Procs. of Electrochemical Socieety Symposium on Electroceramics, LA–UR 87–4190, Honolulu, HI Oct. 22, 1987.

Raistrick et al., "Electrical Response of Electrochemical Capacitors Based on High Surface Area Ruthenium Oxide Electrodes," submitted to Electrochemical Society Procs., Los Alamos Nat'l Lab, Los Alamos, NM, LA–UR 87–2340.

Raistrick, "Electrochemical Capacitors,"Invited Ch. Electrochemistry of Semiconductors and Electronics, Processes and Devices, Noyes Publications, pp. 297–359, 1992.

Evans, "The Littlest Big Capacitor — An Evans Hybrid," Evans Capacitor Company Technical Papers, E. Providence, RI; web page at www.evanscap.com/isdle5–2.html, Jan. 22, 1998.

Evans, "High Energy Density Electrolyte–Electrochemical Hybrid Capacitor," Evans Capacitor Company Technical Papers, presented to the 14th Capacitor & Resistor Technology Symposium Mar. 22, 1994 and published in Carts '94 Procs., E. Providence, RI; web page at www.evanscap.com/carts 14–2.html, Jan. 22, 1998.

Evans Capacitor Company Product Information, web page at www.evanscap.com/ourprod.html, Jan. 22, 1998.

Oxley, High–Rate Solid–State Electrochemical Capacitors, IEEE, pp. 346–350, 1990.

McHardy, "Electrochemical Capacitors," American Inst. of Aeronautics and Astonautics, Inc., pp. 306–308, 1987.

"KTI Hydros–Ruthenium Oxide Capacitors, A History and Comparative Analysis"No Date.

Johnson et al., "Basic Electric Circuit Analysis," Prentice Hall Inc., pp. 172–175, 1984.

Jow et al., "Hydrous Ruthenium Oxide as an Electrode Material for Electrochemical Capacitors,"Army Research Laboratory, Electronics and Power Sources Directorate, for Monmouth, NJ, Feb. 1994.

* cited by examiner

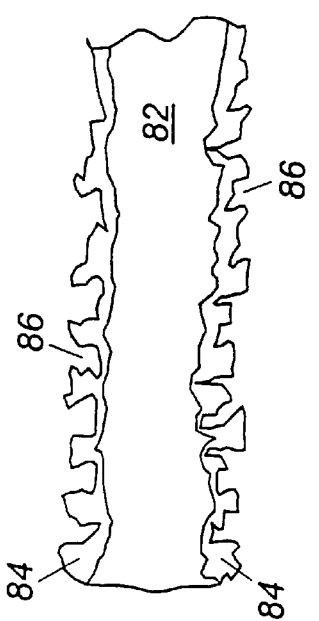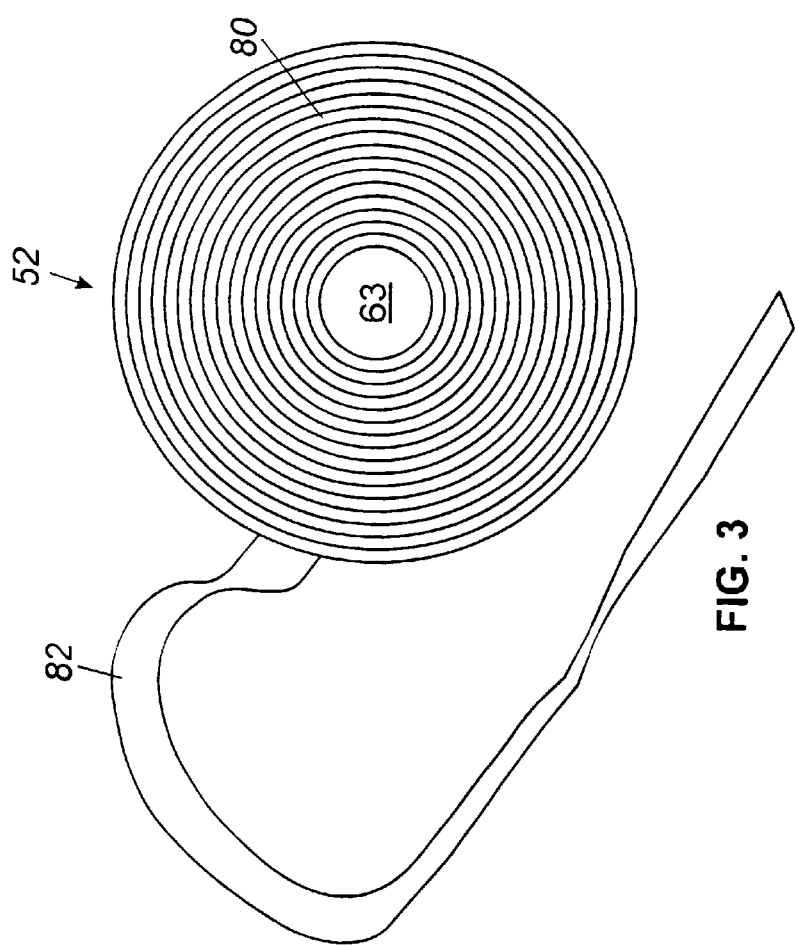

|←— 1" —→|

NON-SYMMETRIC CAPACITOR WITH CONDUCTIVE ADHESION LAYER FOR CATHODE

CROSS-REFERENCE TO RELATED APPLICATIONS

This application is a continuation of and claims priority to U.S. application Ser. No. 09/761,967, filed on Jan. 17, 2001 now abandoned, which is a continuation-in-part application of and claims priority to U.S. application Ser. No. 09/358,577 now abandoned, filed on Jul. 21, 1999, which is a continuation-in-part of U.S. application Ser. No. 09/110,223 now U.S. Pat. No. 6,208,502 filed on Jul. 6, 1998, and which also claims priority from copending PCT Application Ser. No. PCT/US99/15207, filed on Jul. 6, 1999.

BACKGROUND OF THE INVENTION

This invention relates to non-symmetric electrolytic/electrochemical capacitors.

A typical symmetric aluminum electrolytic capacitor (FIG. 1) includes an aluminum anode foil, an aluminum cathode foil, and a conductive liquid electrolyte, such as ethylene glycol. Ethylene glycol is a substantially non-aqueous electrolyte, i.e. it contains less than 3% of water. The liquid electrolyte is retained by a porous paper separator which acts as a spacer between the anode and cathode foils. The anode and cathode foils are connected to external terminals via aluminum tabs.

The surfaces of the aluminum anode and cathode foils are coated with a layer of an insulating aluminum oxide, which is formed by an electro-chemical oxidation process called forming. For the forming process, a constant voltage is applied to the aluminum foils. The formation voltage is higher than a typical rated working voltage of the capacitor. The aluminum oxide thickness is proportional to the applied voltage. In one example, an aluminum electrolytic capacitor may have rated working voltages up to 600 V and forming voltages in the range of 850 to 900 V.

The insulating aluminum oxide is in contact with the conductive electrolyte. The aluminum anode and cathode foils, the corresponding aluminum oxides, and the electrolyte with the separator form two capacitors connected in series (FIG. 1A). The thickness of the insulating aluminum oxide layer determines the breakdown voltage of the capacitor. By varying the aluminum oxide layer thickness, the specific capacitance (i.e., capacitance per surface area) of each capacitor is varied. Increasing the aluminum oxide layer thickness reduces the specific capacitance and increases the breakdown voltage of the capacitor. The specific capacitance may be increased by increasing the active surface area of the aluminum foil. The active surface area of the aluminum foil is increased by etching.

Another class of capacitors are the electrochemical capacitors. Electrochemical capacitors fall into two categories: Faradaic and non-Faradaic (double-layer). Non-Faradaic capacitors rely solely on interfacial charge separation across a boundary between an electrolyte and a conducting surface or an insulating surface such as some metal oxides like aluminum oxide and tantalum oxide. The Faradaic capacitors are often referred to as pseudo-capacitors. Pseudo-capacitors have enhanced charge storage derived from charge transfer through a chemical reaction that takes place across the interface between an electrolyte and a conducting surface. The charge transfer can occur, for example by: (1) surface charge attachment to a metal hydride like ruthenium hydride, (2) volume charge diffusion into a metal like silver coated palladium, or (3) an oxidation/reduction reaction at the surface of an oxide like ruthenium oxide.

Non-symmetric electrolytic/electrochemical capacitors use a conventional electrolytic capacitor at the anode and an electrochemical capacitor at the cathode. Evans U.S. Pat. No. 5,737,181 describes a non-symmetric capacitor that has a pseudo-capacitor ruthenium oxide ceramic cathode, a tantalum anode and an aqueous electrolyte. Non-symmetric capacitors with modified metal cathode surfaces are disclosed in Libby U.S. Pat. No. 4,780,797 and Rogers U.S. Pat. No. 4,523,255, which describe very aggressive aqueous electrolytes (e.g., sulfuric acid) that have high conductivity and are compatible with tantalum and tantalum oxide anodes.

SUMMARY OF THE INVENTION

In general, the invention features a capacitor of the type having a cathode and an anode and an electrolyte disposed between the cathode and the anode, the capacitor comprising an electrochemical cathode comprising a metal current collector, at least one conductive adhesion layer deposited on the metal current collector, a finely divided material deposited on the adhesion layer, an electrolytic anode comprising an oxide forming metal and a corresponding insulating metal oxide, and an electrolyte in contact with the finely divided material on the cathode and the oxide on the anode.

In preferred implementations, one or more of the following features may be incorporated. There may be a single conductive adhesion layer. The adhesion layer may comprise a carbon rubber material that provides a roughened surface onto which the finely divided material is deposited. The adhesion layer may be from 0.5 to 2.0 mil in thickness. The finely divided material may comprise carbon particles and the electrochemical cathode provides a double layer capacitance. The finely divided material may comprise a conducting metal oxide and the electrochemical cathode provides an oxidation reduction reaction. The metal oxide may comprise ruthenium oxide. The metal oxide may comprise hydrous amorphous ruthenium oxide powder. The metal oxide may be suspended in a proton conducting binder. The metal oxide and proton conducted binder may be applied suspended in a solvent, and the suspension may be applied to the metal current collector by a printing process. The anode may comprise aluminum and aluminum oxide.

Using an adhesion layer to adhere the finely divided material on the current collector produces a cathode that performs well and may be manufactured at lower cost than with prior art techniques.

Other features and advantages of the invention will be apparent from the following description of preferred embodiments, and from the claims.

BRIEF DESCRIPTION OF THE DRAWINGS

FIG. 3 is a perspective view of an anode roll useful in some embodiments.

FIG. 4 is a cross-sectional view of a thin etched aluminum foil.

DESCRIPTION OF THE PREFERRED EMBODIMENTS

Figure 2:
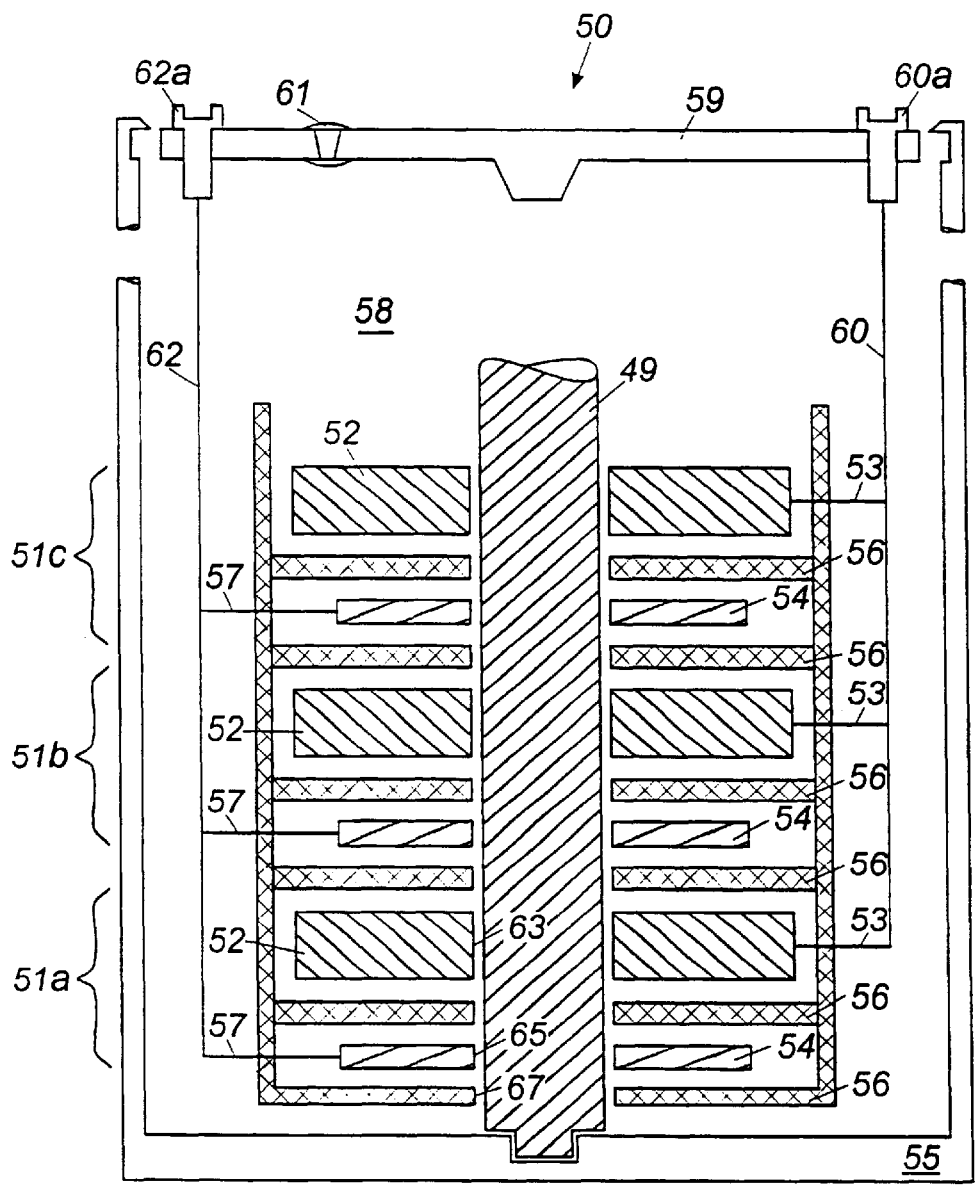
FIG. 2 is a cross-sectional view of a non-symmetric electrolytic/electrochemical capacitor embodiment of the invention.

FIG. 2 shows a first embodiment of a multi-section non-symmetric capacitor 50. Although only three capacitor sections 51a to 51c are shown for purposes of illustration, a typical embodiment may have more sections (e.g., 5 to 50, or many more). Each capacitor section 51a includes an anode 52, a cathode 54, an electrolyte 58 (liquid that impregnates the capacitor or partially fills the interior of container 55), and separator disks 56. In one example, the anodes 52, cathodes 54, and the separator disks 56 have annular shapes with central openings 63, 65, and 67, respectively. The anodes 52 are interleaved with the cathodes 54, and the individual capacitor sections are stacked so that a sequence of cathode/anode/cathode/anode is formed. The separator disks 56 separate the cathodes 54 from the anodes 52 within a capacitor section, and from the anodes in the adjacent capacitor section. The stacked sections 51a, 51b, and 51c are supported by a plastic support member 49, which is fed through the central openings 63, 65 and 67. The section assembly is placed in a plastic container or other suitable container, such as an aluminum case 55 which is closed on the top with a cover 59. The cover has a vent 61 and anode and cathode voltage terminals 60a, 62a. The vent is configured to open when the pressure inside the capacitor exceeds a certain value, e.g., 75 psi.

The anodes 52 may be formed by splitting and winding etched and formed aluminum foil 82. For example, starting with a wide roll (in one example the width may be in the range between 50 to 100 cm), the material may be split (in one or more splitting steps) into 3–23 mm wide sheets, which are then wound to form a plurality of narrow rolls 80 (FIG. 3). Conventional processes may be used to etch the aluminum foil and form the aluminum oxide layer 84 (shown diagrammatically in FIG. 4). The etching process produces micron size holes 86 in the foil. The holes increase the effective surface area of the anode. In one example, the aluminum foil is 6 mm wide, and has a thickness of 100 micrometers. The etched aluminum holes 86 with the aluminum oxide layer 84 may be approximately 40 micrometers deep on both surfaces.

Alternatively, the anode may be fabricated by winding a flattened small diameter etched aluminum wire into a roll. The aluminum oxide layer is subsequently formed.

The insulating aluminum oxide surface of the anode contacts the electrolyte 58, to form an anode capacitor consisting of conductive aluminum/insulating aluminum oxide/conductive electrolyte.

The cathode 54 may be formed by coating a metal current collector with a finely divided material. A finely divided material is a conducting material or any material which supports an electrochemical capacitance at an interface with an electrolyte and has a very high ratio of surface area to volume. In some instances, the surface of the current collector is coated with a layer of a non-insulating oxide. The finely divided material provides the interface with the electrolyte which functions as an electrochemical capacitor. In one example, the thickness of the cathode is in the range between about 75 to 100 micrometers.

Figure 5:
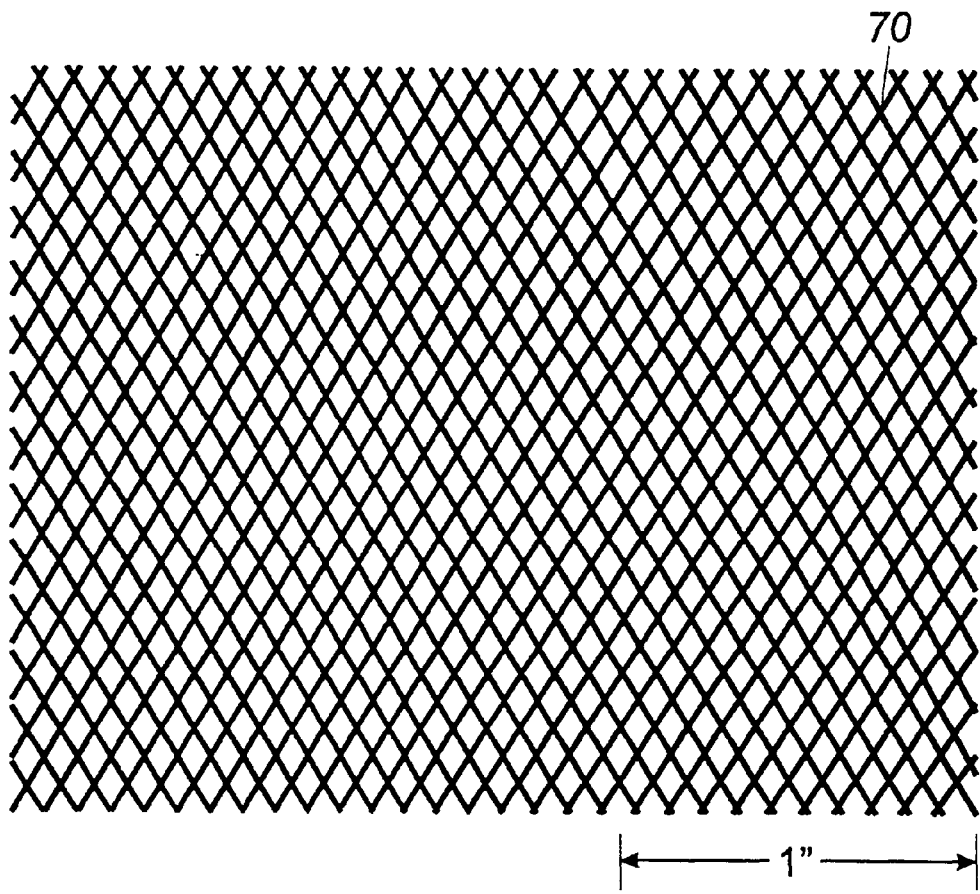
FIG. 5 is a perspective view of an expanded nickel mesh that may be used in the cathode.
Figure 6:
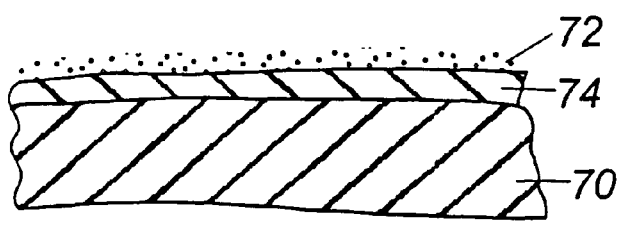
FIG. 6 is a perspective view of the cathode collector coated with a finely-divided powder.

A variety of materials may be used for the cathode current collector. They include materials that do not oxidize, such as noble metals, platinum or palladium, or materials that form a conducting or a semiconducting oxide, such as nickel and titanium. If nickel is used, e.g., a nickel mesh as shown in FIG. 5, care should be taken to avoid an electrolyte in which ammonia is used, as this may produce corrosion in the nickel.

A non-insulating oxide forming current collector is required because if a thin insulating oxide layer develops between the high gain cathode capacitor and the current collector, it will contribute to the formation of an additional capacitor. The additional capacitor will be formed between the conductive current collector/insulating oxide/conductive carbon powder. This additional capacitor will be connected in series with the electrochemical capacitor. When two capacitors are connected in series the capacitor with the smallest capacitance (in this case the additional capacitor) dominates and the benefit of the increased energy density of the electrochemical capacitor with the large capacitance diminishes.

The finely divided material, which together with the electrolyte forms the electrochemical capacitor, may be carbon powder, carbon fibers, graphite, platinum powder, oxide powders, such as ruthenium oxide, or mixtures of these powder materials. The material must provide a capacitor-like voltage/current relationship for the cathode.

The electrolyte 58 is a conducting liquid using either gamma-butyrolactone or ethylene glycol as the major solvent. The gamma-butyrolactone is a substantially non-aqueous solvent, using an aromatic dicarboxylic acid/organic base as the major ionogen for conductivity. A cosolvent, such as methoscypropiomitrile, is added in concentrations up to 15% to modify low temperature characteristics. Specific depolarizers, such as benzyl, are added to reduce gassing, and organic phosphates to improve the oxide stability. The ethylene glycol system is also a substantially non-aqueous electrolyte, and uses aliphatic dicarboxylic acids/ammonia as ionogens. A water content of 1.5 to 2.5% improves the oxide formation capability during aging and low temperature characteristics. Specific depolarizers, such as p-nitrobenzoic acid are added to reduce gassing, and organic phosphates to improve the oxide stability.

These electrolyte mixtures have very attractive properties for the aluminum anode. These include ability to form an insulating oxide layer through aging on the cut anode surfaces, long shelf life, ability to withstand high surge voltages, both low and high temperature performance with a small temperature coefficient, strong gas absorption properties to provide long service life, and ability to work with low cost separators. The electrolyte mixtures also work well with many of the possible cathodes (e.g., titanium with a ruthenium oxide or carbon powder coating), even though they are non-aqueous and have a near neutral ph.

A presently preferred cathode is titanium printed with hydrated amorphous ruthenium oxide as disclosed in U.S. Pat. Nos. 5,600,535 and 5,621,609, granted to the United States of America on Feb. 4, 1997 and Apr. 15, 1997, respectively. Such a cathode will work with the above described ethylene glycol electrolyte. The cathode may also be constructed by printing ruthenium oxide on another current collector material (e.g., aluminum). The titanium substrate is preferably a foil about 12.5 to 50 micrometers thick (preferably 25 micrometers), which may be in the form of individual sheets or a roll.

Printing is accomplished by first coating both sides of the titanium with a conductive adhesion layer, e.g., a Rexam (TM) carbon-rubber material produced by the COER-X process (material available from Rexam Graphics, South Hadley, Mass.). The adhesion layer should provide a highly conductive, but noncapacitive, surface onto which the ruthenium oxide may be deposited. The surface of the carbon-rubber coating has a roughness that allows the ruthenium oxide to remain adhered. The coating should be kept thin to minimize its resistance. A thickness of about 5 micrometers has been found to function well, but other thicknesses (e.g., 2.5 to 12.5 micrometers) can be used.

After the titanium foil has been coated with the carbon-rubber layer, hydrous amorphous ruthenium oxide powder is deposited onto the coated surfaces as a thin film (e.g., by screen printing) about 5 micrometers thick (other thicknesses, e.g., 2.5 to 12.5 micrometers may also be used). The hydrous amorphous ruthenium oxide has been mixed with a proton conducting binder, which serves to provide mobile protons to the hydrous amorphous ruthenium oxide and to bind the ruthenium oxide particles so as to maintain close interparticle contact to minimize internal resistance. Suitable proton conducting binders are organic polymers having a fluorinated backbone and terminal sulfonic acid carboxylic acid groups on a fluorinated chain pendant to said fluorinated backbone. A preferred proton conducting binder is a fluorinated material arising from copolymerization of tetrafluoroethylene and $FSO_2CF_2CF_2OC(CF_3)FCF_2OCF=CF_2$ (Dupont Nafion™ in an aqueous solution). More detail on depositing the hydrous amorphous ruthenium oxide as a thin film can be found in Chen et al. U.S. application Ser. No. 09/137,227, filed by T. B. Kim Technologies International, Inc., of Los Angeles, Calif. The hydrous amorphous ruthenium oxide thin film is preferably applied by screen printing, using a printing solvent to suspend the ruthenium oxide particles and proton conducting binder. The ruthenium oxide is printed in a specific pattern matching the geometry of the stacked individual anode rolls, thereby reducing the amount of expensive ruthenium oxide that is used.

The cathode may also be constructed by adhering carbon powder to an aluminum current collector. Aluminum, which is already in use in the anode, has the advantage of being fully compatible with the preferred nonaqueous electrolyte. The difficulty with using aluminum for the current collector of the cathode has been that aluminum tends to form an insulating passive oxide when exposed to air. Such an oxide layer is unacceptable, for it provides, in effect, a small further capacitor in series with the principal capacitance provided by the cathode and anode, thereby unacceptably lowering the overall capacitance. By using aluminum foil on which carbon powder has been adhered without an intervening oxide layer, these problems may be overcome. One such carbon coated aluminum foil product is available from W. L. Gore, Microfiltration Technologies Group, Dallas, Tex.

A further alternative is to bond Rexam (TM) adhesion layer to an aluminum cathode collector without an intervening oxide layer. Then, either ruthenium oxide or carbon powder may be applied.

Referring again to FIG. 2, the capacitor sections 51a to 51c are connected in parallel to each other. The aluminum anodes 52 are spirally wound disks of standard etched and formed aluminum, about 100 Tm thick, 50 mm in diameter, and 6.3 mm wide. The material can be obtained from a variety of sources (e.g., Aerovox, Beckermel, Satma, or JCC). A plurality (e.g., 3 to 10) of layers of aluminum are wound together and electrically connected in parallel so as to reduce the overall resistance of the anode for the same overall capacitance.

Electrical connections to the anodes are made using metal tabs 53 (small pieces of soft aluminum) mechanically attached between the brittle anodes and anode leads 60. The anode leads 60 are lightly etched and formed aluminum. Cathodes 54 also have metal tabs 57, which are ultrasonically welded to a cathode lead 62. The cathode lead 62 is preferably soft aluminum. The anode and cathode leads 60 and 62 are connected to the voltage terminals 60a and 62a, respectively, located on the top cover 59.

The separator disks 56 may be constructed from standard duplex or plain kraft paper or similar materials like Manila or Hemp (e.g., 50–200 micrometers thick). Other separator materials which can be used with the butyrolactone electrolyte mixtures and the ethylene glycol electrolyte mixtures include Kraft, manila or hemp fibers, or composites made from other paper separators and polypropylene fibers.

The much higher capacitance of the cathode compared to the anode allows the cathode to have a much smaller surface area, e.g., 0.2% to 2% of the area of the anode.

Figure 7:
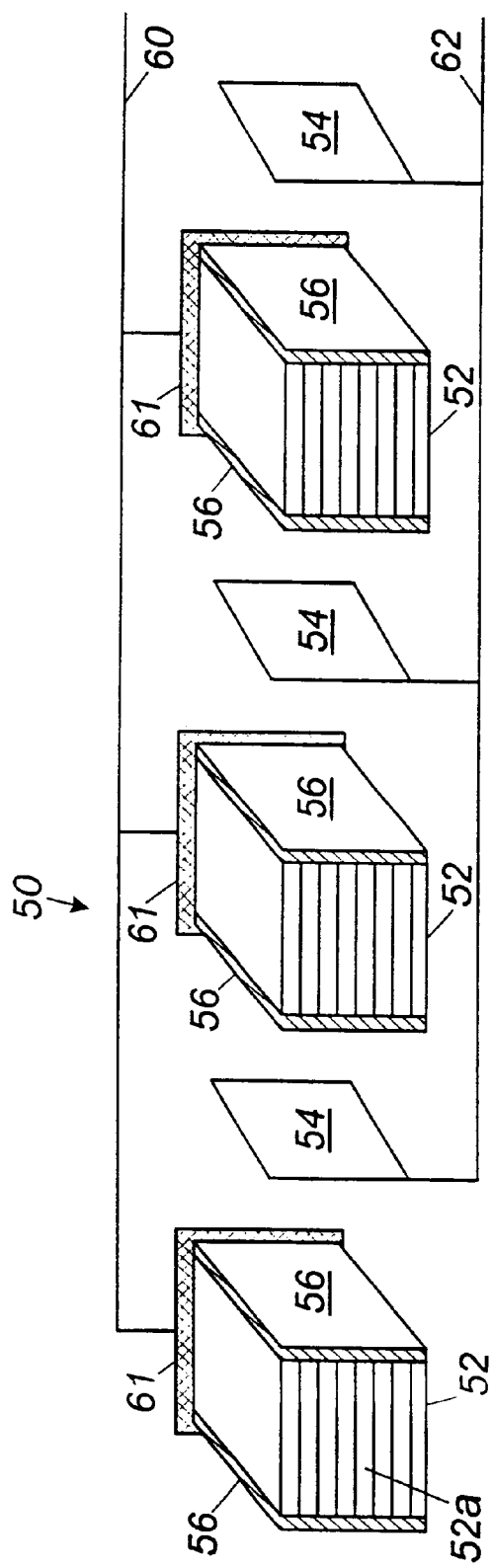
FIG. 7 is a diagrammatic view of a multi-cell non-symmetric electrolytic/electrochemical capacitor.

FIG. 7 shows an alternative multi-section capacitor 50, which includes cathodes 54, separators 56, collector plates 61, and cubic anodes 52, which are formed as stacks of etched and formed aluminum sheets 52*a*. The aluminum sheets 52*a* have a rectangular shape. The cubic anodes 52 can be built in a progressive cut-to-length line with two degrees of freedom. The stacked, etched, and formed aluminum sheets 52*a* are spot welded using a laser dot matrix pattern or ultrasonic welding. The cathodes 54 are shown as sheets of material that are interleaved between separators 56 and anodes 52. The collector plates 61 are conductive material conductively adhered to the ends of the individual aluminum sheets 52*a*.

This construction further reduces the series resistance and provides an attachment point for the anode lead 60, which can be spot-welded to each of the individual anode collector plates 61. This construction puts all the individual anode sheets 52*a* in parallel and leads to a further reduction in the series resistance.

This multi-section capacitor 50 with anodes constructed from stacked aluminum sheets may be assembled using automated assembly equipment fed from two spools of material. One spool provides the cathode material which may be titanium printed hydrous amorphous ruthenium oxide. The second spool provides the anode material which may be a spool of very narrow etched and formed aluminum.

Figure 15:
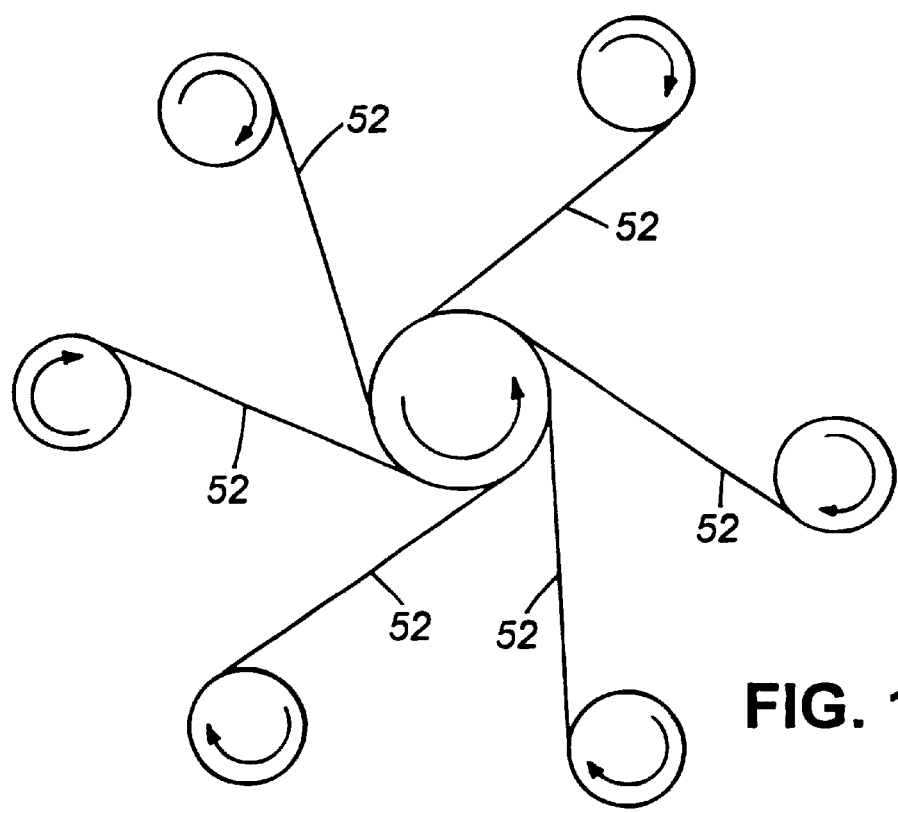
FIG. 15 shows the process for winding an anode with multiple current collector sheets.

Other geometric configurations for the anode are possible. The stacked sheets may be oval or circular. Multiple layers of aluminum may be rolled simultaneously to form anode rolls (as shown in FIG. 15), with each layer electrically connected in parallel. This has the same effect as connecting layers of a stack in parallel. Overall resistance of the anode is reduced for the same overall capacitance.

The butyrolactone and ethylene glycol electrolyte systems are compatible with various polymeric materials (e.g., nylon and polypropylene), thus adding to the low cost packaging options that can be obtained through this approach. This total package has the advantages of providing a very economical capacitor, using a set of materials that have a long field history under electrochemical conditions within a broad temperature range, and providing the basis for a new capacitor with the same long service life under electrochemical conditions.

Figure 8:
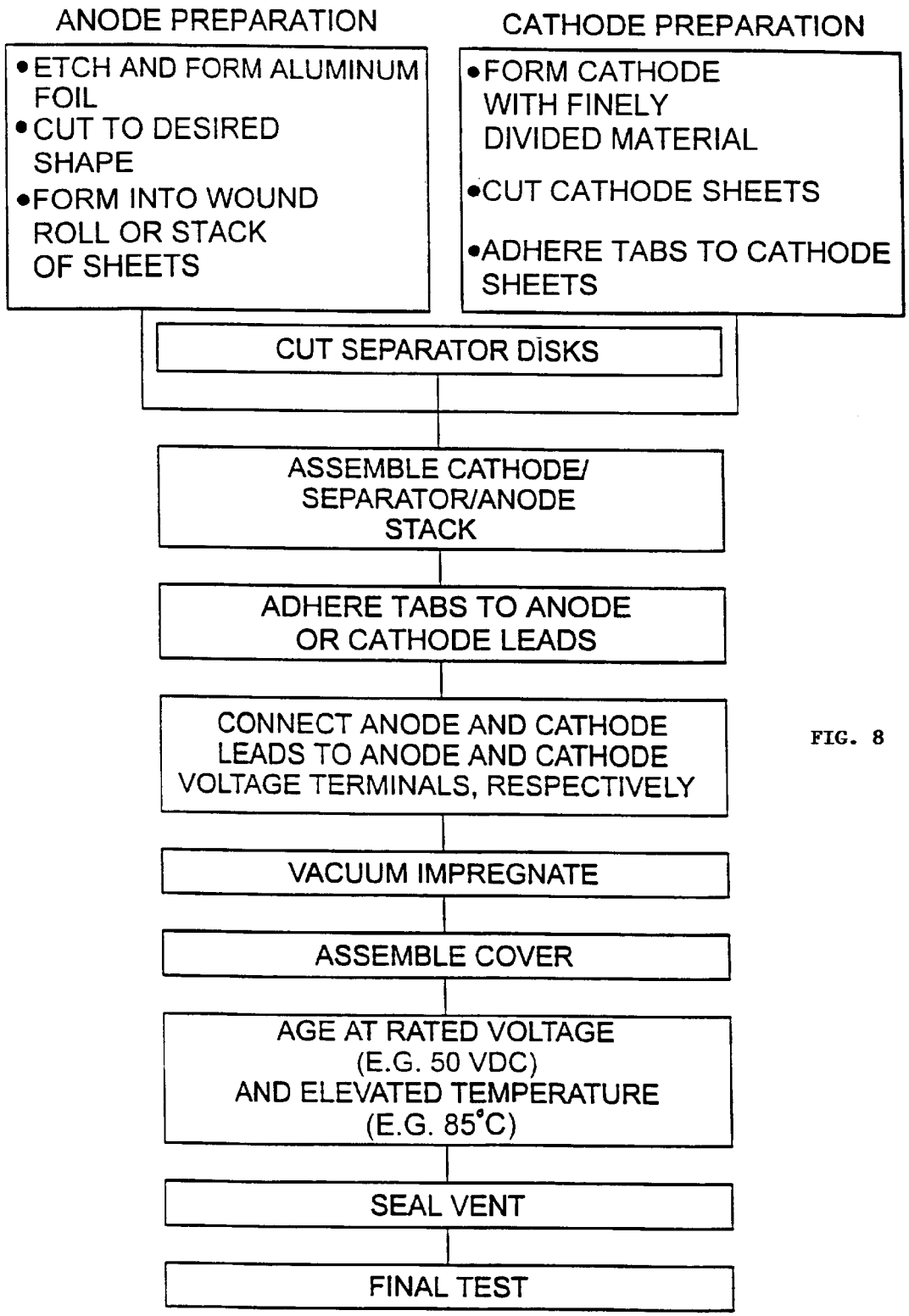
FIG. 8 is a flow chart of the process for fabricating a capacitor.
Figure 9A:
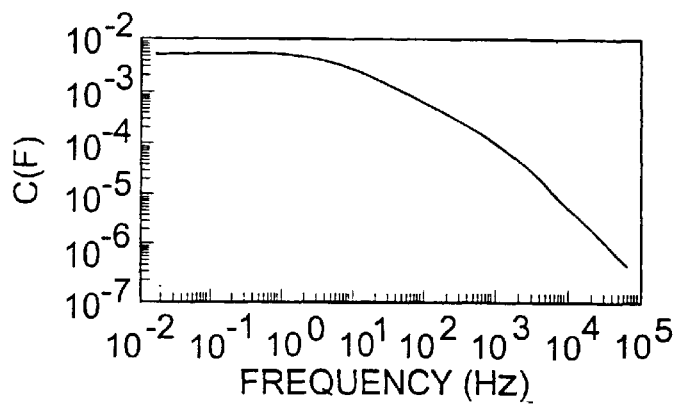
FIGS. 9A to 9D show impedance spectroscopy data for embodiments with a carbon coated nickel cathode, etched and formed aluminum anode and non-aqueous electrolyte.
Figure 9B:
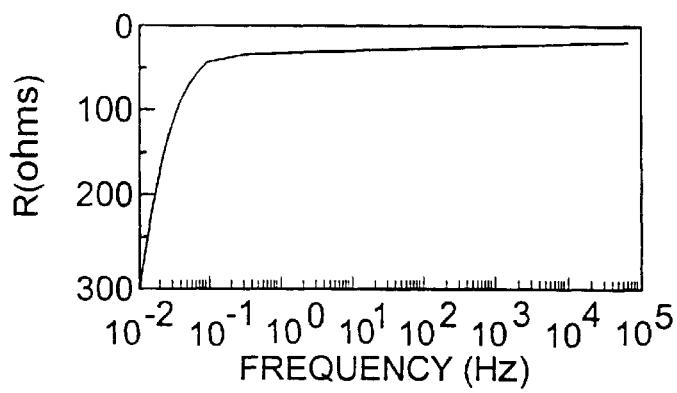
Figure 9C:
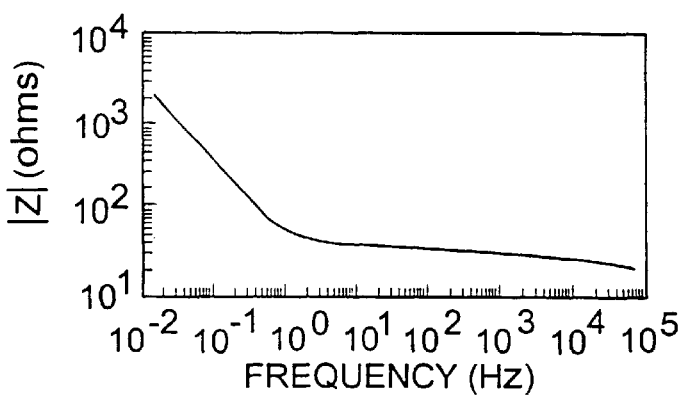
Figure 9D:
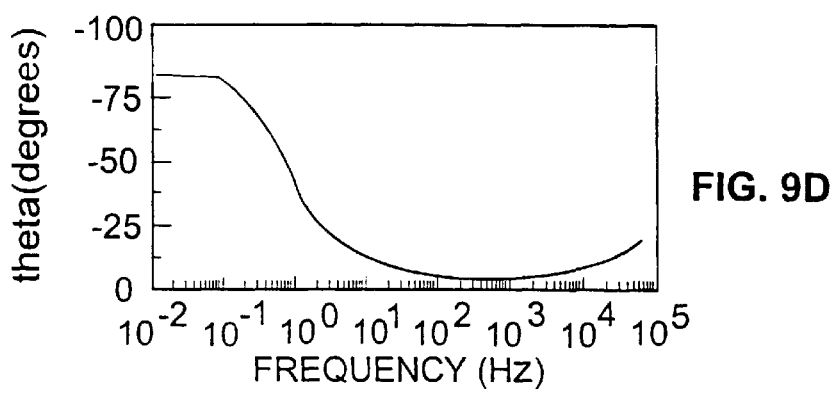
Figure 10A:
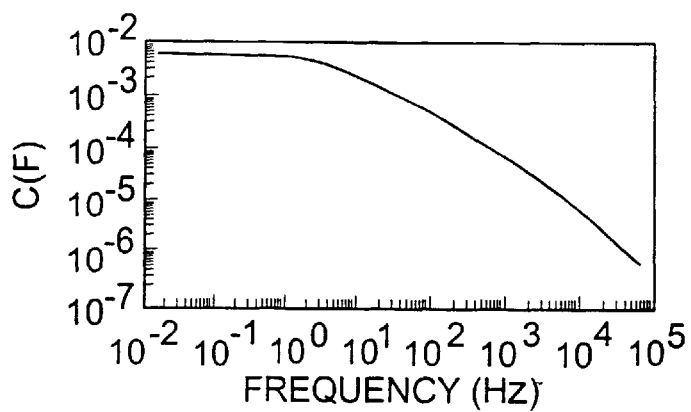
FIGS. 10A to 10D show impedance spectroscopy data for embodiments with a ruthenium oxide coated titanium cathode, etched and formed aluminum anode and non-aqueous electrolyte.
Figure 10B:
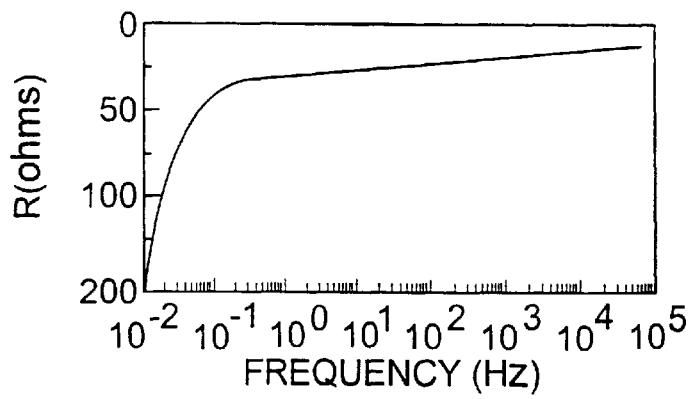
Figure 10C:
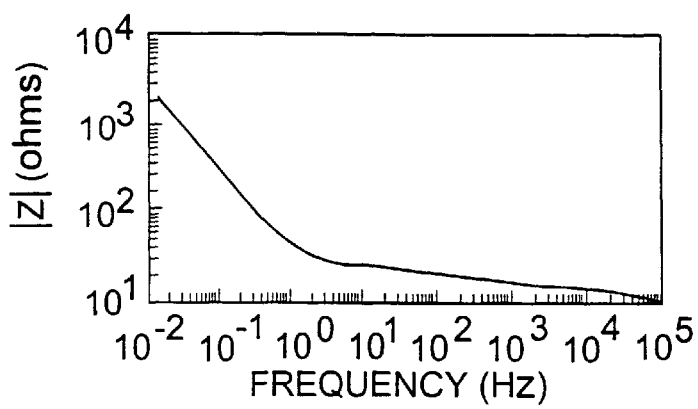
Figure 10D:
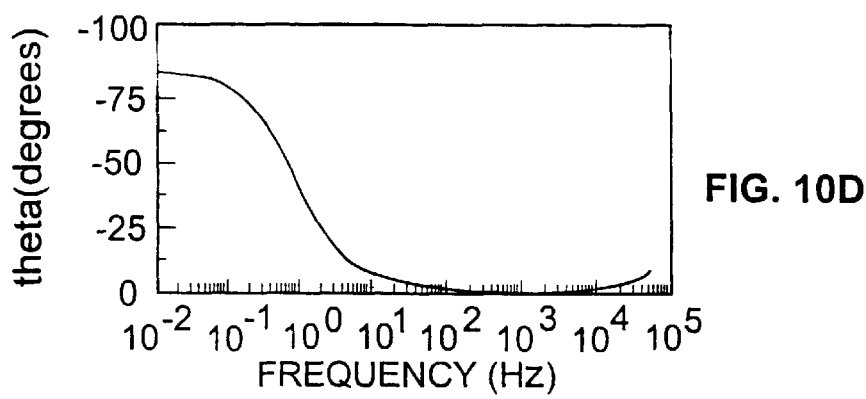
Figure 11A:
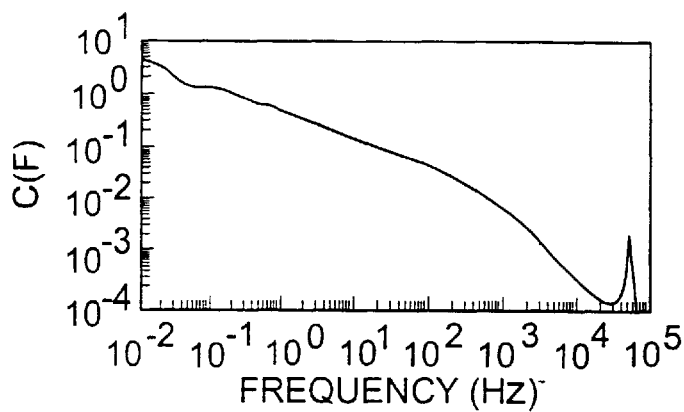
FIGS. 11A to 11D show impedance spectroscopy data for embodiments with carbon coated nickel electrodes (anode and cathode) and with butyrolactone based electrolyte.
Figure 11B:
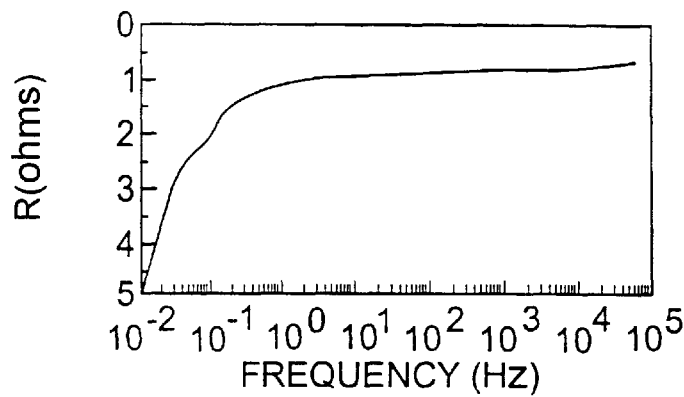
Figure 11C:
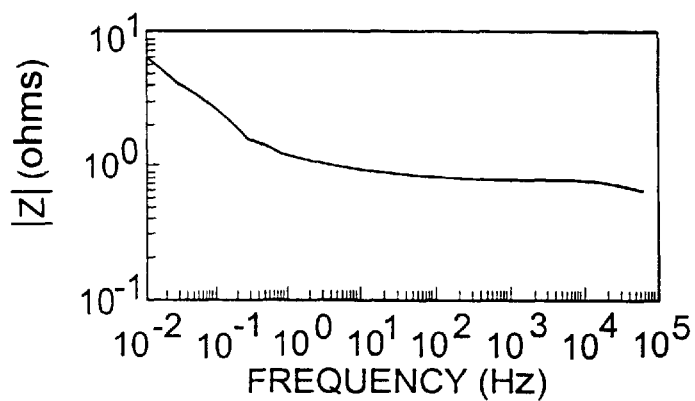
Figure 11D:
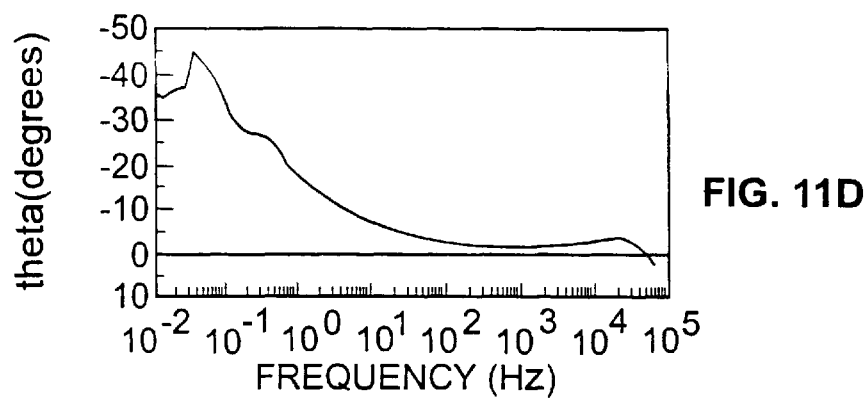
Figure 12A:
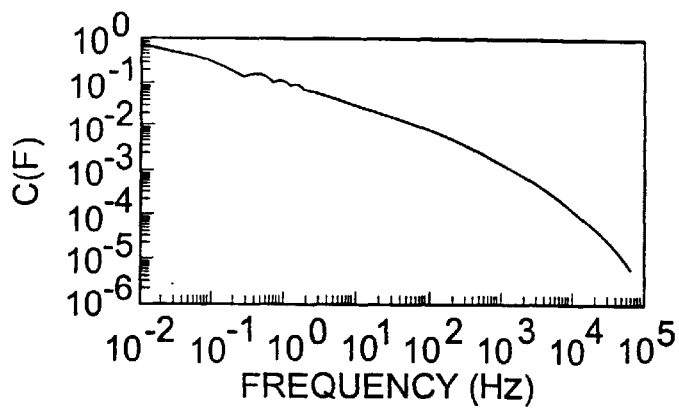
FIGS. 12A to 12D show impedance spectroscopy data for embodiments with carbon coated nickel electrodes (anode and cathode) and with ethylene glycol based electrolyte.
Figure 12B:
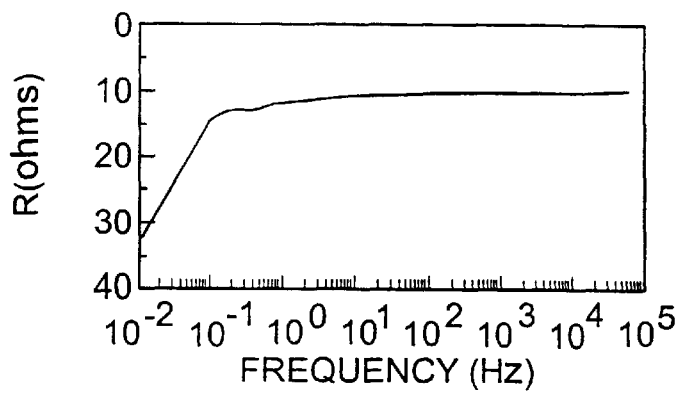
Figure 12C:
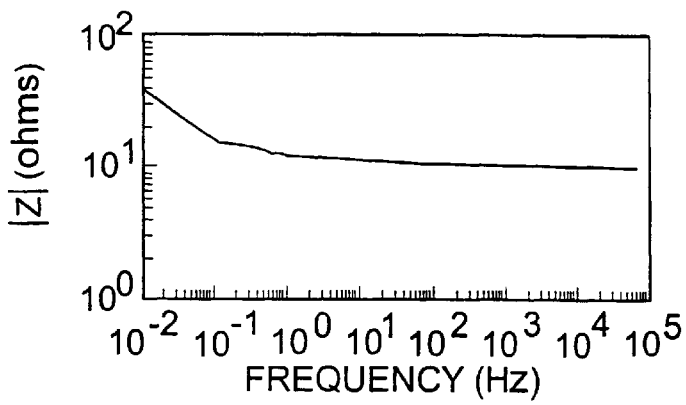
Figure 12D:
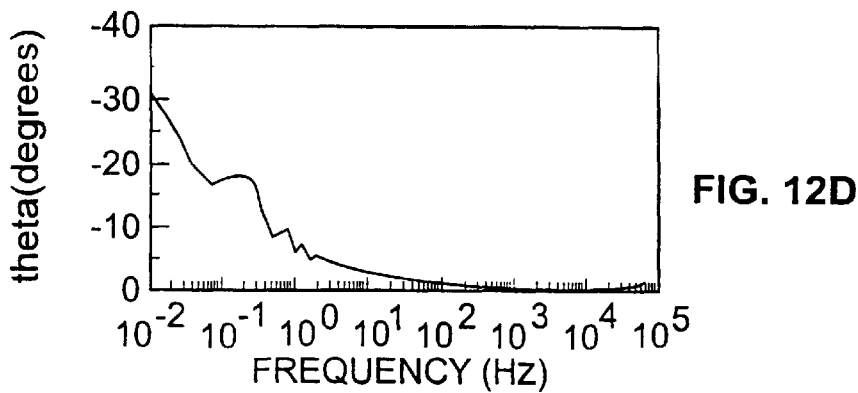

Referring to FIG. 8, one process of making the capacitors includes the following steps: First, the anodes and cathodes are fabricated, and the separator disks are cut. The anodes, separators, and cathodes are then interleaved to form a stack. Anode and cathode tabs are ultrasonically welded to the anode and cathode leads, respectively, and the stack assembly is placed into a container. The anode and cathode leads are then connected to anode and cathode voltage terminals, respectively, located on the container cover. The stack assembly is vacuum impregnated with a substantially non-aqueous electrolyte. The container is closed with the cover, additional electrolyte may be added, and the capacitor is aged at a rated voltage (e.g., 50 V DC) and elevated temperature (e.g., 85 EC). Finally, the vent is sealed, and the capacitor performance is evaluated by bridge measurements and DC leakage current measurements at rated voltage.

Figure 2A:
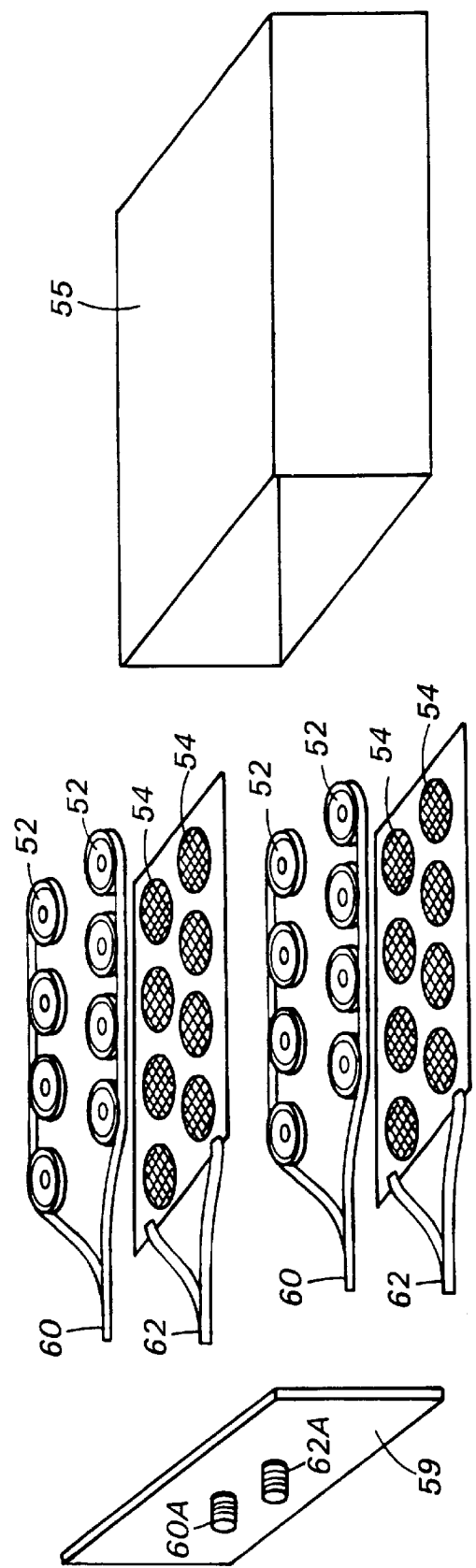
FIG. 2A is an exploded perspective view of another non-symmetric electrolyte/electrochemical capacitor embodiment of the invention.

Another multi-section capacitor construction is shown in FIG. 2A. The aluminum anodes 52 are arranged in groups (e.g., eight are shown) in the same layer, rather than having only a single anode in each layer, as in FIG. 2. Leads from each anode are connected to anode lead 60, which leads to terminal 60*a* on the cover 59. The cathodes are titanium with hydrous amorphous ruthenium oxide printed in circular areas aligned with the aluminum anodes; cathode leads 62 connect the cathode sheets to terminal 62*a* on the cover 59.

The stack of aluminum anode layers and cathode layers fits within a rectangular-shaped housing 55. Insulating separator sheets (not shown) formed from the same materials as discussed above for separator disks 56 are positioned between the anode and cathode layers. Although circular anodes and matching circular cathode areas are shown in the figure, it may be preferable to use other shapes to increase the density of the capacitor; e.g., oval shaped anodes and matching oval shaped cathode areas could be substituted.

The assembly is formed by stacking the various components, i.e., separator material (one to three sheets typically), one layer of titanium coated foil, separator material (one to three sheets typically), an array of 8 anodes (two columns and 4 rows) with the tab material leads adhered together to form one lead per layer, separator material (one to three sheets typically), one layer of titanium coated foil, etc. The assembly may contain a number of layers (e.g., 10 to 20). The geometry of the capacitor can be varied and there is no standard number of anodes in an array and there is no standard or preferred number of stack layers in a complete assembly.

The individual anode layers and cathode layers are connected in parallel by adhering the individual aluminum leads to an aluminum bar across the top of the assembly. The assembly resembles a block, which is approximately 9 cm by 11 cm by 24 cm. Polypropylene insulation (18 Tm) is wrapped around the rectangular assembly and held in place with electrical tape. The two aluminum bars (one for the cathode connections and one for the anode connections) contain holes, which are bolted to the terminals in the cover (one for the anode and one for the cathode). The cover assembly is fabricated from a punched sheet of 40 mil food grade aluminum stock, folded and welded with holes for aluminum ceramic terminals. The cover assembly also contains a small vent hole which is sealed with a rubber plug after impregnation. The cover assembly with the capacitor is purshed down inside of an aluminum can, which has also been fabricated from food grade aluminum sheets. The cover assembly is welded to the top of the aluminum case. The complete capacitor (vent plug open) is impregnated in electrolyte using a standard vacuum-pressure impregnation oven. The impregnated capacitor is then aged using a standard oven aging power supply. The capacitor after aging is cooled to room temperature and the vent plug is sealed into the capacitor.

Figure 16:
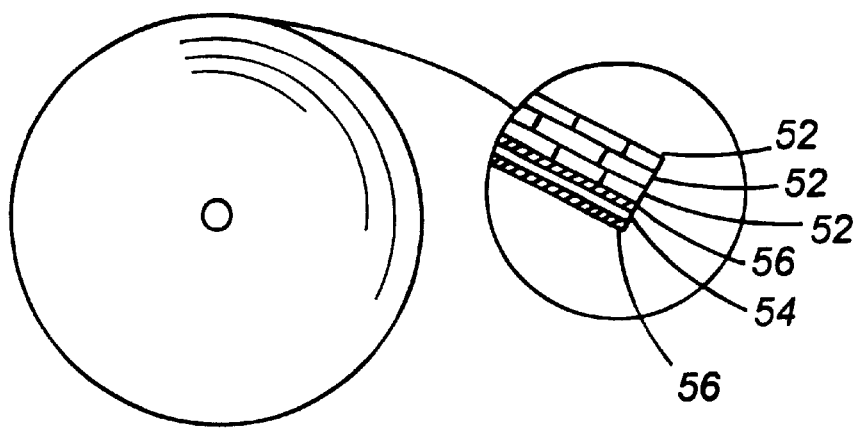
FIG. 16 is an end view of another non-symmetric electrolytic/electrochemical capacitor embodiment of the invention, in which both the anode and cathode layers are wound in the same winding. A portion of the winding is shown enlarged to provide a diagrammatic view of the cathode, anode, and separator layers.
Figure 17:
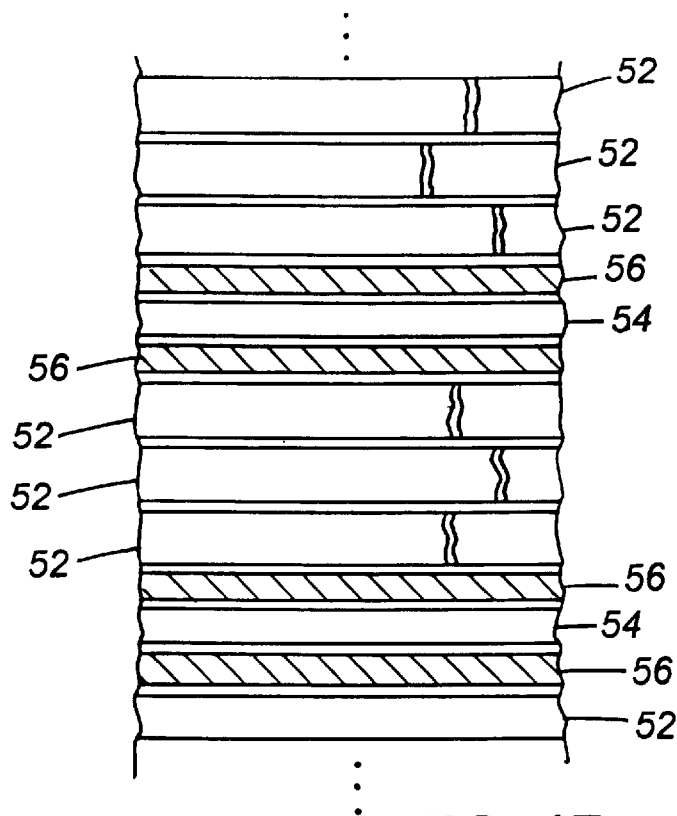
FIG. 17 is a diagrammatic cross sectional view of a tiny portion of the embodiment of FIG. 16, showing the cathode, anode, and separator layers in cross section.

Referring to FIGS. 16 and 17, another construction for the non-symmetric capacitor has anode layers 52, cathode layers 54, and separator layers 56 wound in the same roll. A single such roll could form the capacitor, or multiple rolls could be connected together internally. The enlargement of the end of the winding in FIG. 16 shows the various layers, as does the cross sectional view in FIG. 17, which shows an enlargement of a tiny area of a cross section through the winding of FIG. 16. The anode and cathode layers are constructed as taught for the other disclosed embodiments, with one important exception. The anode layers are tunnel etched, so that tiny etching holes extend substantially fully through each anode layer. The tunnel etched holes are coated with aluminum oxide in a forming process. MacFarlane U.S. Pat. No. 5,584,890 discloses a symmetric electrolytic capacitor in which both anode and cathode are oxide coated aluminum, and the tunnel etching is provided in one of the anode and cathode.

In this alternative embodiment, the tunnel etching provides a path for conductive ions to flow between the cathode layer and anode layers. Three anode layers 52 separated by spacer layers 56 from a single cathode layer 54 are shown.

But varying numbers of anode layers (preferably between 1 and 7 layers) could be interspersed between each cathode layer. And the cathode layer could be formed by providing a plurality of adjacent cathode layers.

Figure 1:
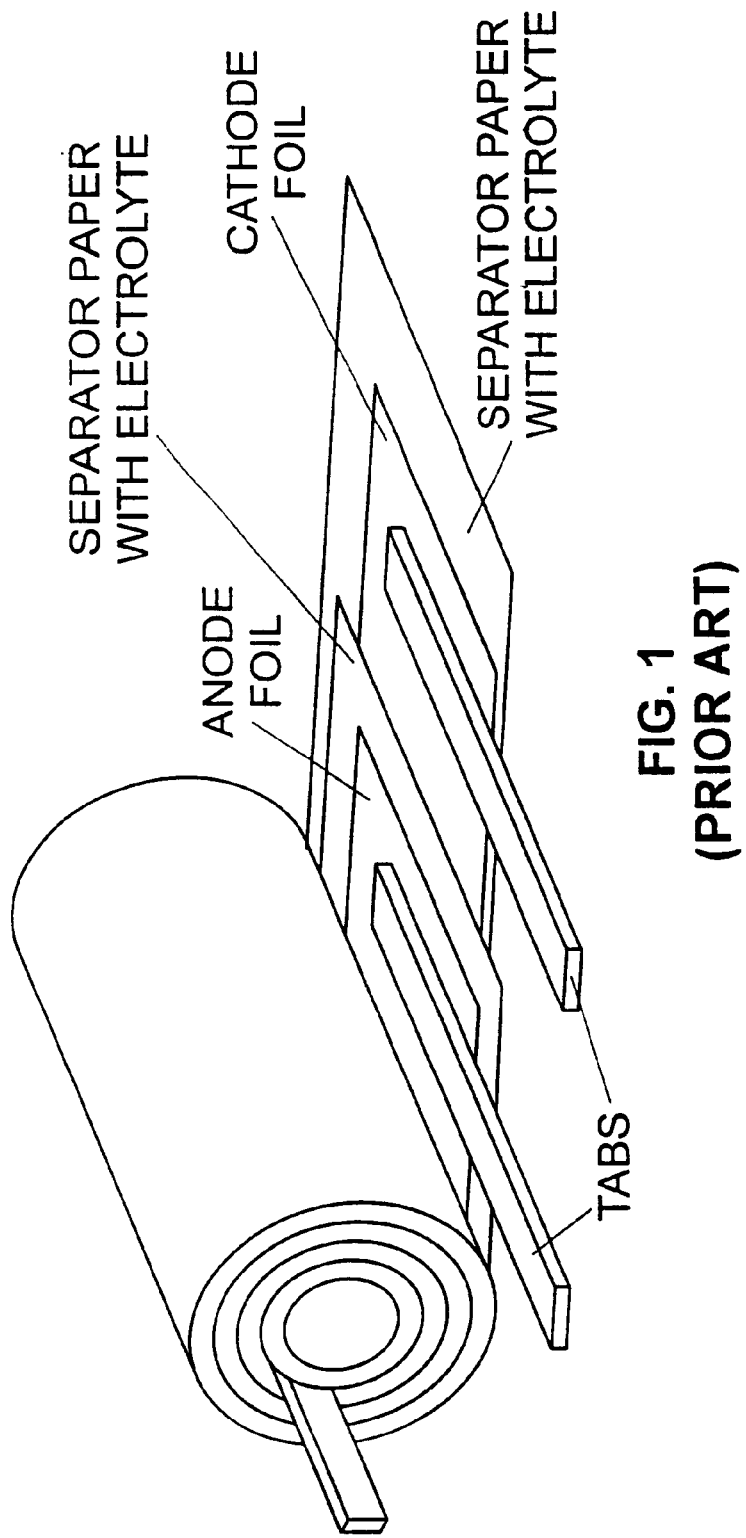
FIG. 1 is a cross-sectional view of a prior art symmetric aluminum electrolytic capacitor.
Figure 1A:
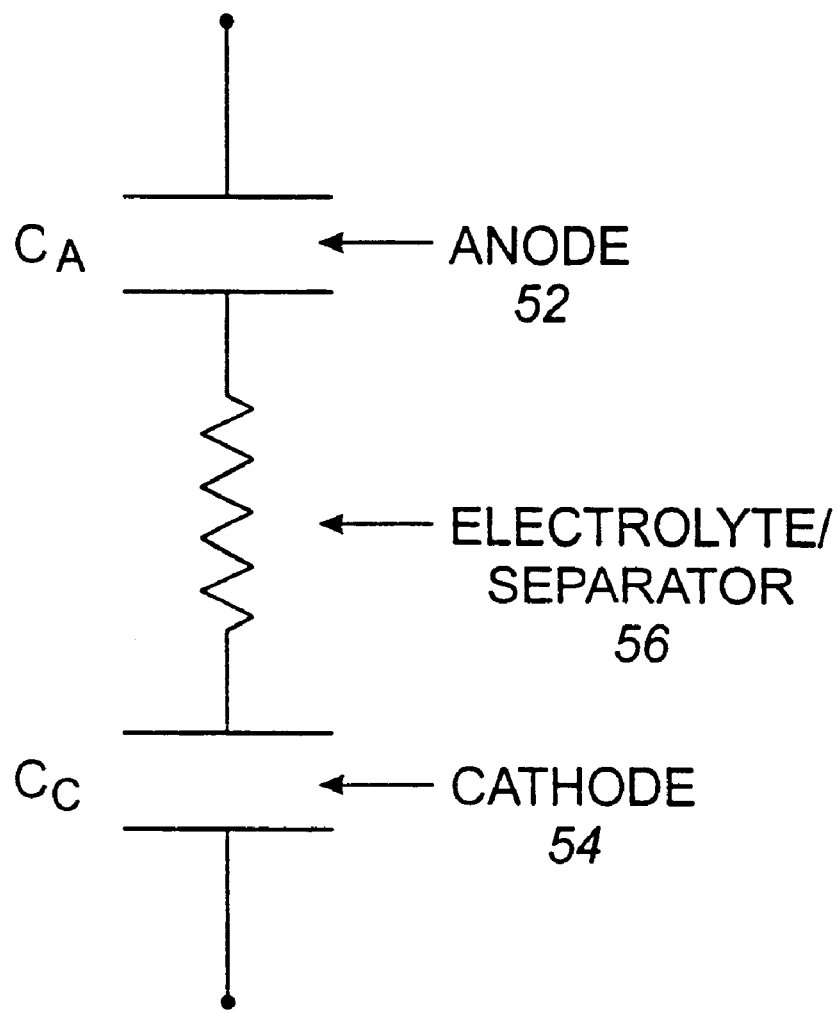
FIG. 1A is an equivalent circuit diagram of a prior art symmetric electrolytic capacitor.

The arrangement of FIGS. 16 and 17, in which cathode and anode layers are wound together, is preferred over the arrangement of FIGS. 1 and 2A, in which anode windings are interspersed between cathode sheets, as the width of the winding becomes greater. It appears that it may be preferable to use the arrangement of FIGS. 16 and 17 when the width of the winding (e.g., about 6 mm in FIGS. 2 and 2A) is greater than about seven times the aggregate thickness of the anode layers (e.g., each anode layer is about 100 micrometers in FIGS. 2 and 2A). Otherwise, the arrangement of FIGS. 2 and 2A may be preferable.

Figure 18:
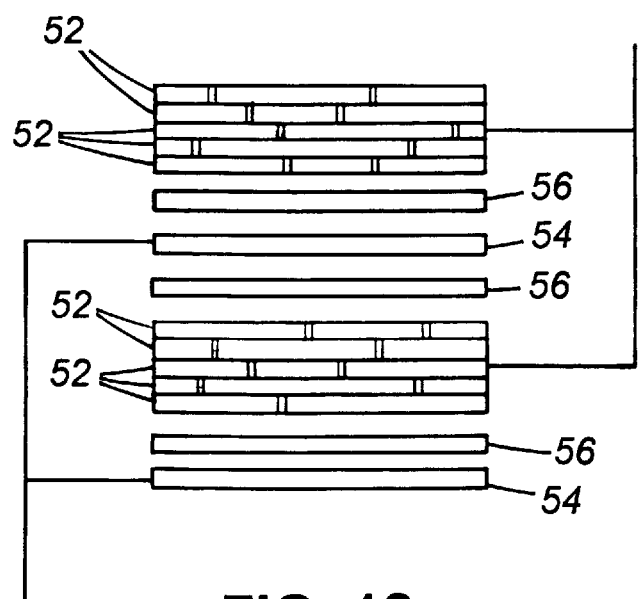
FIG. 18 is a diagrammatic view of a multi-cell non-symmetric electrolytic/electrochemical capacitor wherein the anode layers are parallel to the cathode layers.

FIG. 18 shows an alternative to the arrangement of FIGS. 16 and 17. The anode layers 52, spacer layers 54, and cathode layers 56 are stacked instead of wound. This permits a construction comparable to that of FIG. 7, but with the cathode layers built into the stacks rather than oriented perpendicularly to the edges of the stacked anode layers. Tiny etching holes extend substantially fully through each anode layer 52 just as in the embodiment of FIGS. 16 and 17.

FIGS. 9A to 9D show the impedance spectroscopy of a non-symmetrical capacitor constructed with a cathode made of carbon coated nickel expanded mesh. FIGS. 10A to 10D show the impedance spectroscopy of a non-symmetrical capacitor constructed with a cathode made of ruthenium oxide coated titanium expanded mesh. In both cases, the anode is constructed from etched aluminum foil. The electrolyte is a butyrolactone system.

FIGS. 9A to 9D and 10A to 10D show plots of capacitance (9A, 10A), resistance(9B, 10B), impedance (9C, 10C), and phase angle (9D, 10D) versus frequency. These data demonstrate capacitor performance limited by the capacitance of the anode for frequencies that are less than 1 Hz for this specific design. The frequency limit may be changed by adjusting the design parameters of the capacitor, for example the carbon coating thickness and anode geometry.

The measurements in FIGS. 11A to 11D and 12A to 12D, show the performance of symmetrical capacitors having carbon coated nickel screen electrodes. In FIGS. 11A to 11D, the electrolyte is butyrolactone based and in FIGS. 12A to 12D, the electrolyte is ethylene glycol based. The curves demonstrate capacitive performance with both electrolyte systems.

One of the advantages of this non-symmetric capacitor is that it can be used for high voltage application without series construction. Conventional electrochemical capacitors are limited to low voltages (e.g., less than or equal to 4.5 V). Higher voltage capacitor ratings using electrochemical capacitor technology require series construction. Series construction of electrochemical capacitors leads to voltage sharing problems, high series resistance, and sealing problems (the individual series section must be isolated electrically).

Since the capacitor uses an aluminum electrolytic anode, voltages as high as 600 V DC can be applied to the anode. Most of the applied voltage is placed on the anode, by choosing the anode capacitance to be a small fraction of the cathode capacitance. The interleaving construction leads to anode sections, that are operated in parallel, not in series. This eliminates the voltage sharing problems, leads to a much lower series resistance, and eliminates the sealing problems.

The lower series resistance is important for high current pulsing applications and continuous ripple current applications. Low series resistance directly relates to an increase in the peak current, that can be pulsed through the capacitor. Low series resistance also relates to a lower power factor for continuous ripple current applications.

Another advantage of the capacitor is increased energy density for the non-symmetric capacitor. The ability to operate with a very limited amount of cathode material leaves more room within the same size case for anode material. This leads to an increase in the energy stored in the capacitor by a factor of 2 to 3 over conventional electrolytic capacitors.

A further advantage comes from possible construction differences. Conventional aluminum electrolytic capacitors require etched foils, which must have some mechanical strength and flexibility so they can be formed and wound on a high-speed automatic forming and winding machine. This limits the etching and therefore the specific capacitance of the anode foil and, in turn, the amount of stored energy.

Another advantage of the capacitor is improved service life. In DC applications of conventional aluminum electrolytic capacitors, the leakage current and gassing of the aluminum foils (primarily at the cathode) can limit the life of the capacitor by forming internal gas pressure which vents and sets the life of the capacitor. With the capacitors disclosed, hydrogen gassing is typically reduced resulting in considerably extended life for the capacitor.

Another advantage is improved time constant. Electrochemical capacitors are inherently slow devices (long time constant) because of the high contact resistance across the large porous active surface area of the electrodes. The thick porous oxide layer provides a long conducting path and many conducting interfaces, which lead to a very high resistance. The thickness of the cathode layer is designed so that the cathode capacitance provides the correct voltage across the anode. By substituting the thick porous layer with a finely divided powder coating the thickness of the cathode is reduced. This causes a reduction in the time constant. Shorter time constant can also be obtained by selecting the aspect ratio (surface area to volume ratio) of the specific carbon particles used in the coating on the nickel (or titanium) wire.

Another important design variable with the interleaving construction is the width of the anode roll; the smaller the width the shorter the time constant. By using a narrow anode foil width; the time constant can be decreased to 5 milliseconds. This is still too slow for high ripple current computer grade applications, but it is suitable for high CV (capacitance and voltage) low ripple current computer grade applications. In addition to the reduced time constant, the capacitor has less than half the size of an electrolytic capacitor.

The interleaving construction also provides the basis for a new approach to start (AC) electrolytic capacitors. Start (AC) electrolytic capacitors operate for a relatively short period of time and have a power factor between 2.5 to 6.5%. Conventional electrochemical capacitors have a power factor higher than 10% at line frequency and therefore are not suitable for AC start capacitor applications.

Figure 13A:
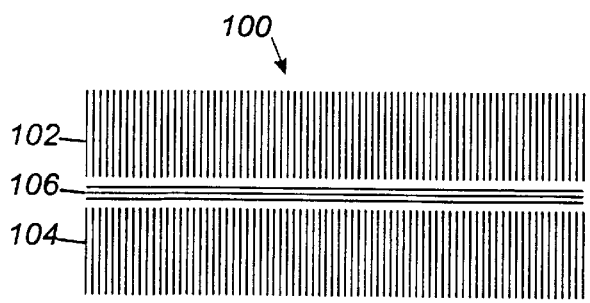
FIG. 13A is a diagrammatic view of a double anode structure for an AC start capacitor.
Figure 13B:
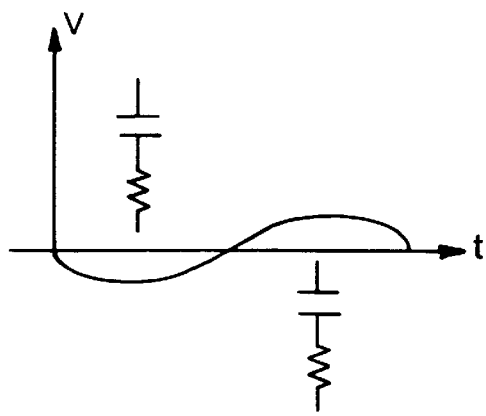
FIG. 13B is a plot of the applied AC voltage across the double anode structure of FIG. 13A.

Referring to FIG. 13A, a typical double layer structure AC start electrolytic capacitor 100 has two anodes 102 and 104 wound back to back and separated by a separator 106. The formed aluminum oxide on the anodes functions as a diode, i.e. acts as an insulator in the forward bias direction and as a resistor in the reverse bias direction (bias is the direction of the applied electric field compared to the direction of the formed polarization electric field). When an AC voltage V is applied across the structure 100, at any point of the voltage waveform, one anode is a capacitor and the other a resistor (FIG. 13B). Therefore, the structure 100 behaves like a capacitor with a high power factor due to the resistance of the second anode.

Figure 14A:
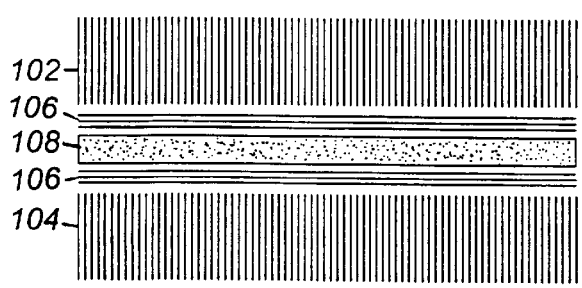
FIG. 14A is a diagrammatic view of a double anode with a floating capacitor structure for an AC start capacitor.
Figure 14B:
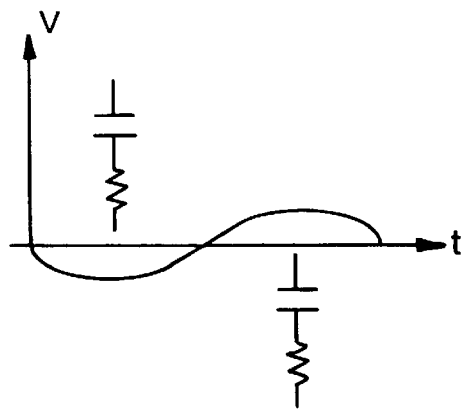
FIG. 14B is a plot of the applied AC voltage across the double anode with the floating capacitor structure of FIG. 14A.

Referring to FIG. 14A, an AC start electrolytic capacitor, includes in addition to the two anodes 102 and 104 a floating cathode 108 interleaved between the opposite polarized anodes. Separators 106 separate the anodes from the cathode. The behavior of the double anode with the floating cathode structure is the same as the double anode structure (FIG. 14B) except that the floating cathode reduces the anode formation voltage and thus the aluminum oxide thickness on the anodes. The reduced aluminum oxide thickness results in reduction of the time constant, size and cost of the AC start capacitor.

Replacing the floating aluminum cathode with a floating electrochemical cathode provides the same reduction in the anode formation voltage and has the additional benefit of reduced weight and size.

What is claimed is:

1. A capacitor comprising
    an electrochemical cathode comprising
        a metal current collector,
        at least one conductive adhesion layer deposited on the metal current collector,
        a finely divided material deposited on the adhesion layer,
    an electrolytic anode comprising an oxide forming metal and a corresponding insulating metal oxide, and
    an electrolyte in contact with the finely divided material on the cathode and the oxide on the anode.

2. The capacitor of claim 1 wherein there is a single conductive adhesion layer.

3. The capacitor of claim 1 wherein the adhesion layer comprises a carbon rubber material that provides a roughened surface onto which the finely divided material is deposited.

4. The capacitor of claim 3 wherein the adhesion layer is from 0.5 to 2.0 mil in thickness.

5. The capacitor of claim 3 wherein the finely divided material comprises carbon particles and the electrochemical cathode provides a double layer capacitance.

6. The capacitor of claim 3 wherein the finely divided material comprises a conducting metal oxide and the electrochemical cathode provides an oxidation reduction reaction.

7. The capacitor of claim 6 wherein the metal oxide comprises ruthenium oxide.

8. The capacitor of claim 7 wherein the metal oxide comprises hydrous amorphous ruthenium oxide powder.

9. The capacitor of claim 6 or 8 wherein the metal oxide is suspended in a proton conducting binder.

10. The capacitor of claim 9 wherein the metal oxide and proton conducted binder are applied suspended in a solvent, and the suspension is applied to the metal current collector by a printing process.

11. The capacitor of claim 9 wherein the anode comprises aluminum and aluminum oxide.

12. The capacitor of claim 11 wherein the adhesion layer comprises a carbon rubber material that provides a roughened surface onto which the finely divided material is deposited and
    wherein the adhesion layer is from 0.5 to 2.0 mil in thickness.

13. The capacitor of claim 1 wherein the adhesion layer is from 0.5 to 2.0 mil in thickness.

14. The capacitor of claim 1 wherein the anode comprises aluminum and aluminum oxide.

* * * * *